United States Patent [19]

Umehara

[11] Patent Number: 4,489,447
[45] Date of Patent: Dec. 25, 1984

[54] TOILET BOWL

[76] Inventor: Yozaburo Umehara, 2-8-6, Shakujiimachi, Nerima-ku, Tokyo, Japan

[21] Appl. No.: 426,101

[22] Filed: Sep. 28, 1982

[30] Foreign Application Priority Data

Jun. 10, 1981 [JP] Japan .................................. 56-159195
Jun. 23, 1982 [JP] Japan .................................. 57-108152

[51] Int. Cl.³ ............................................ A47K 13/12
[52] U.S. Cl. ........................................... 4/240; 16/342
[58] Field of Search .................. 4/236, 240; 16/337, 16/341, 342, 385, 386, DIG. 33

[56] References Cited

U.S. PATENT DOCUMENTS 2,901,753  9/1959  Sperzel ............................... 4/236 X
3,474,470 10/1969  Watson ................................. 4/240
3,837,042  9/1974  White ................................ 16/385 X

FOREIGN PATENT DOCUMENTS 955746  4/1964  United Kingdom ................. 16/341

Primary Examiner—Charles E. Phillips
Attorney, Agent, or Firm—Karl F. Ross; Herbert Dubno

[57] ABSTRACT

Pins of hinges connecting a toilet seat and a toilet lid to the body of a toilet bowl are formed as spring pins. The spring pins are tightly fitted in pin insertion holes and give desired rotational friction to the seat and the lid.

7 Claims, 14 Drawing Figures 4,489,447

TOILET BOWL

FIELD OF THE INVENTION

The present invention relates to a toilet bowl, to the body of which the pins of the hinges connecting a toilet seat and a toilet lid are formed as spring pins, which are tightly fitted in pin insertion holes and give desired rotational friction to the seat and the lid.

BACKGROUND OF THE INVENTION

In a conventional toilet bowl, since solid pins are used for the hinges supporting the toilet seat and the toilet lid, the friction on the sliding contact portions between each solid pin and the pin insertion holes formed in the toilet seat and the toilet lid is likely to decrease. For that reason, the lid often unexpectedly closes due to its own weight causing an impact, when the lid, for instance, slips down out of the hand at the time of opening the lid. This impact closing of the lid may result in not only making an unpleasant noise but also damaging the toilet bowl. Such a tendency is greatly promoted as the sliding contact portions mentioned above wear, and such wearing is likely to occur, for the lid is generally opened or closed so often.

When a spring pin is used for a pivot, as mentioned in Japanese Patent 56-8607, the friction acting in the sliding contact poritions is automatically compensated for by the force of the pin which acts to expand the spring pin itself in the radial direciton, so that the lid is prevented from closing due to its own weight.

However, it has recently turned out that when a spring pin rotates excessively in the pin insertion hole or, when an abnormal axial force acts on the spring pin, the spring pin is forced to vibrate in the hole and slip forward in the axial direction of the spring pin and even unexpectedly drop out of the hole.

OBJECTS OF THE INVENTION

An object of the present invention is to provide a toilet bowl whose spring pin is effectively kept from dropping out of the pin insertion holes.

Another object of the present invention is to provide a toilet bowl in which adequate frictional resistance to the rotation is always applied to the hinge of the toilet seat and lid lest the seat and lid should unexpectedly close due to their own weight and causing an impact.

A further object of the present invention is to provide a toilet bowl in which the hinge devices do not begin to rattle or the pivots of hinges do not drop off even if the sliding contact portions wear due to the frequent use of the toilet bowl.

SUMMARY OF THE INVENTION

These objects and others are attained with a toilet bowl comprising a toilet bowl body; both a toilet seat and a toilet lid which are provided on the toilet bowl body; a pair of stationary members fixed at spaced apart positions on the toilet bowl body; a pair of pivotal supporting parts integral with the toilet seat and inserted between the stationary members; a pivotal supporting part integral with the toilet lid and inserted between the former pivotal supporting parts; a pair of three-element receiving insertion holes provided in each stationary member and the pivotal supporting parts of the seat and lid near each stationary member, respectively; and a pair of spring pins coaxially inserted into the three-element receiving insertion holes, respectively, whereby the seat and lid are hinged on the toilet bowl, characterized in that a wedge is tightly fitted in at least one end of each spring pin so that the end of the spring pin is fixed in the pin insertion hole.

BRIEF DESCRIPTION OF THE DRAWING

Various other objects, advantages and features of the present invention will become readily apparent from the following detailed description, reference being made to the accompanying drawing in which.

SPECIFIC DESCRIPTION

Figure 1:
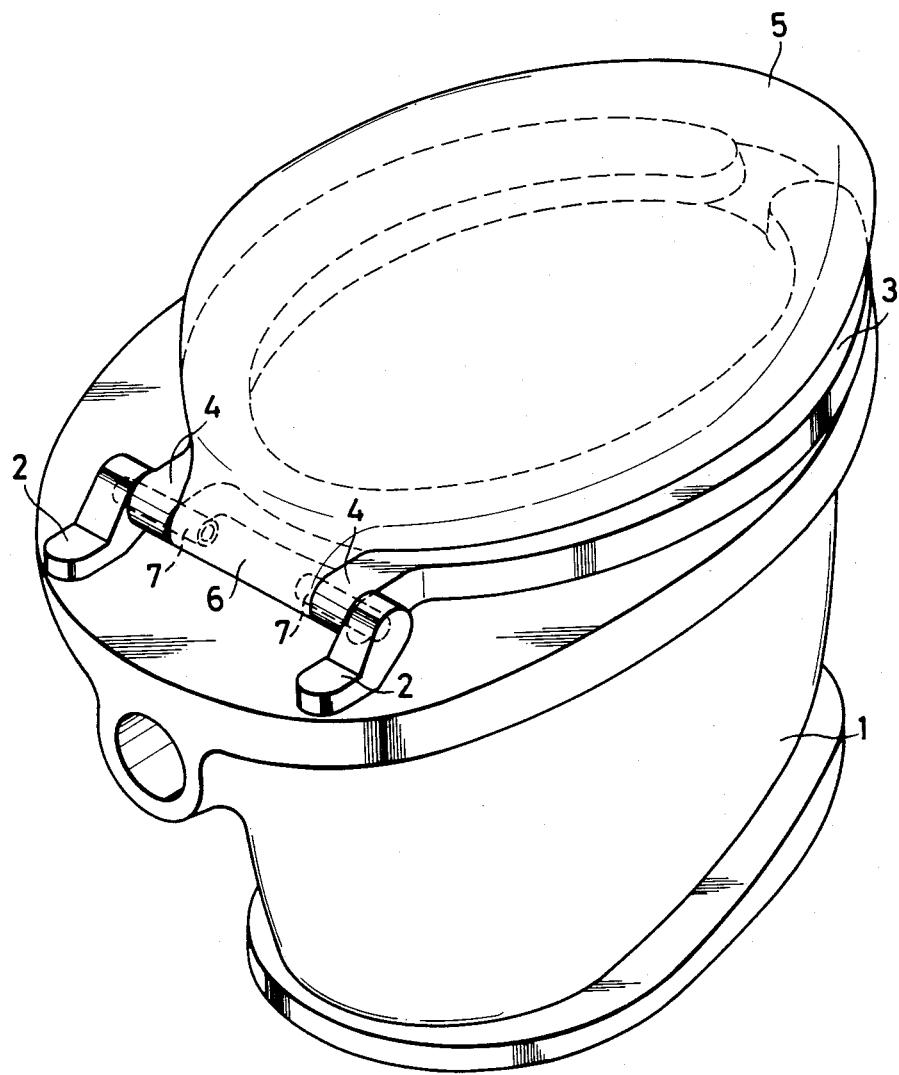
FIG. 1 is an perspective view of a toilet bowl according to the present invention.

A toilet bowl in a first embodiment according to the present invention is hereinafter described referring to FIGS. 1, 2, 3A, 3B and 3C. As shown in FIG. 1, a pair of members 2 are fixed at appropriate points on the top of the toilet bowl body 1 by conventional fixing means. A pair of pivotal supporting parts 4 integrally formed on a toilet seat 3 and another pivotal supporitng part 6 integrally formed on a toilet lid 5 are located between the stationary members 2. These pivotal supporting parts 4, 6 form respectively the parts of hinges for the toilet seat 3 and the toilet lid 5, the pivots of which are formed by spring pins 7 formed as elongated thin walled cylindrical sleeve of uniform cross section and wall thickness .

Figure 2:
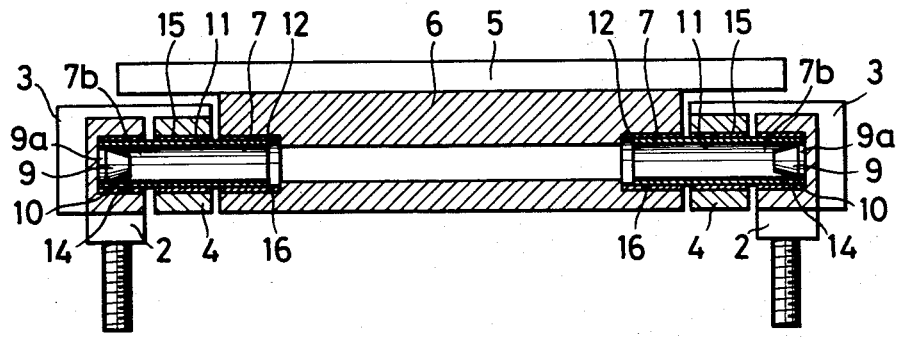
FIG. 2 is an axial sectional view of the hinge portion of a toilet seat and lid in a first embodiment according to the present invention.

As shown in FIG. 2, each stationary member 2 is provided with a pin insertion blind hole 10, and the pivotal supporting parts 4, 6 are provided with pin insertion throughgoing holes 11, 12. Cylindrical metal bushings 14, 15, and 16 made of stainless steel or the like are fixed in the pin insertion holes 10, 11 and 12 by force fitting, bonding or the like. Spring pins 7 are inserted into the metal bushings 14, 15 and 16 so that the pins extend through the bushings and are compressed in the radial direction against the bushings by the spring force. Therefore, the spring pins 7 are biased by their spring force into elastic contact with the inner surfaces of the metal bushings 14, 15 and 16. Each spring pin 7 shown in FIG. 2 has a wave-shaped slit 7a shown in FIGS. 3A, 3B and 3C.

A truncated-cone-shaped wedge 9 made of metal less harder than each spring pin 7 is tightly fitted into its end 7b at the stationary member 2, as shown in FIG. 2. Since the hardness of the spring pin 7 is designated as Hv 446 to 560 by the JIS B-2808, the wedge 9 is preferably made of mild steel of Hv 160 to 170 in hardness when the spring pin is made of spring steel. When the spring pin is made of stainless steel (JIS SUS420 J2), the wedge 9 is preferably made of the material prescribed by the JIS SUS304, whose hardness lies within Hv 160 to 170, processed by solid solution treatment. One end 7b of the spring pin 7 is expanded in the radial direction by the tight fitting of the wedge 9 so that the outer surface of the end 7b is very tightly fitted into the inner surface of the pin insertion hole 10. At that time, the wedge 9 is tightly fitted in up to its entirely cylindrical skirt 9a provided at one end, so that the wedge is fixed. Alternately, the wedge 9 may be tightly fitted in the other end of the spring pin 7 at the end by pivotal supporting part 6, or a pair of wedges 9 may be tightly fitted in both ends of the spring pin 7.

Figures 3A, 3B, 3C:
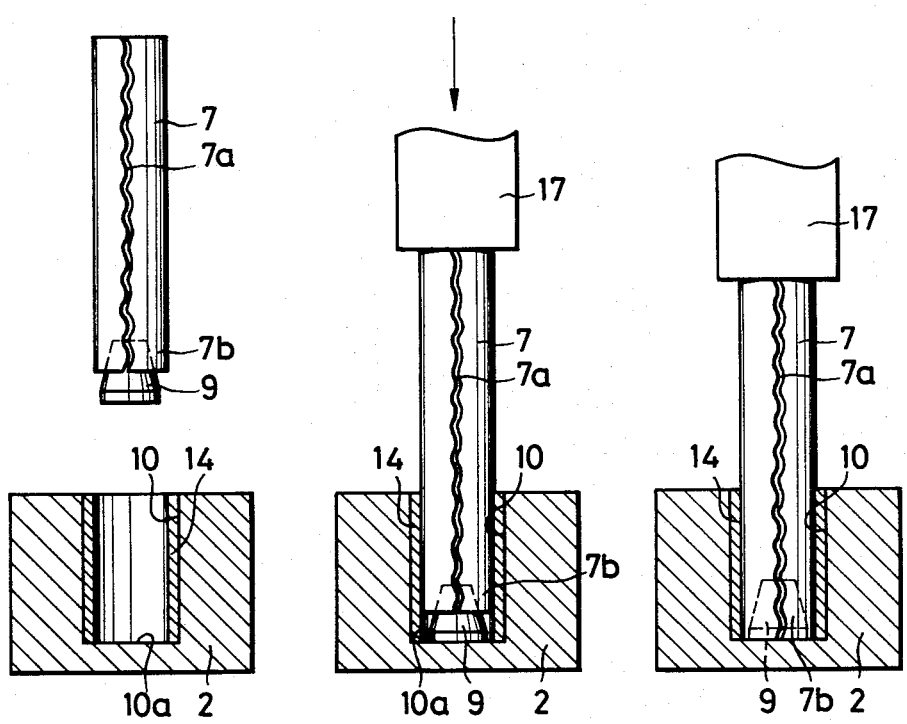
FIGS. 3A, 3B and 3C are enlarged detail views illustrating the main steps of the assembly of the first embodiment.

Since the pin insertion hole 10 is a blind hole, the wedge 9 can be tightly fitted instantaneously in one end 7b of the spring pin 7 when the end 7b is inserted into the metal bushing 14 inside of the pin insertion hole. To carry out such a process, the wedge 9 is first fitted half in the end 7b of the spring pin 7, as shown in FIG. 3A. The end 7b is then inserted into the pin insertion hole 10, so that the wedge 9 is brought into contact with the bottom 10a of the hole, as shown in FIG. 3B. The end 7b is thereafter inserted more deeply in the hole 10, so that the wedge 9 is fully and tightly fitted in the end 7b by the forced downward displacement of pin 7, as shown in FIG. 3C. This tight fitting can be very simply effected by hitting the other end of the spring pin 7 with a hammer 17.

Figure 4:
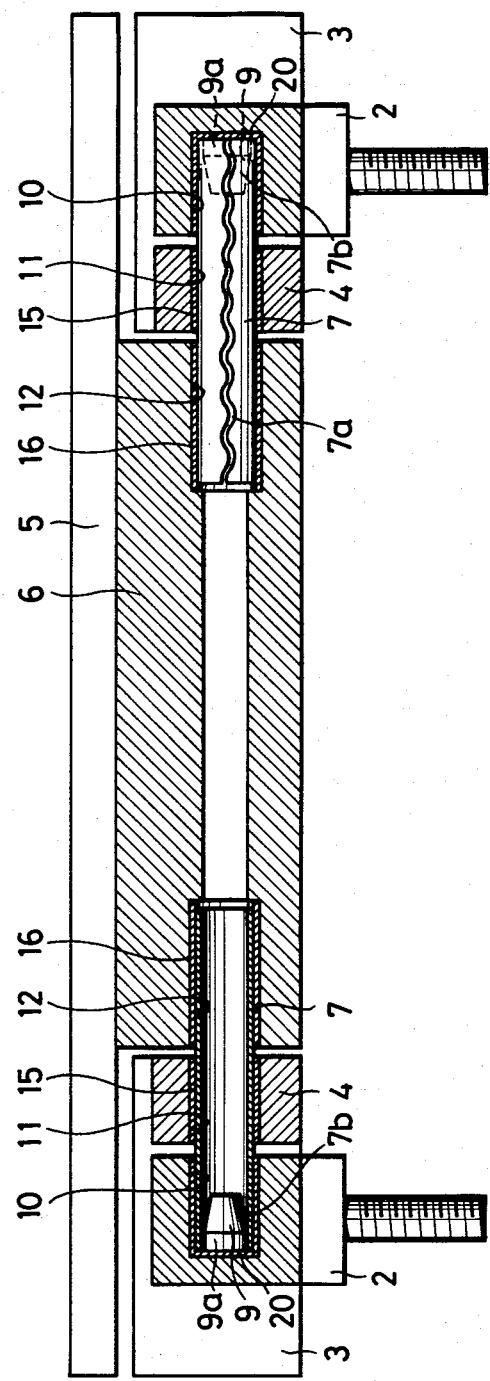
FIG. 4 is an axial sectional view of the hinge portion of a toilet seat and lid in a second embodiment according to the present invention.
Figure 5:
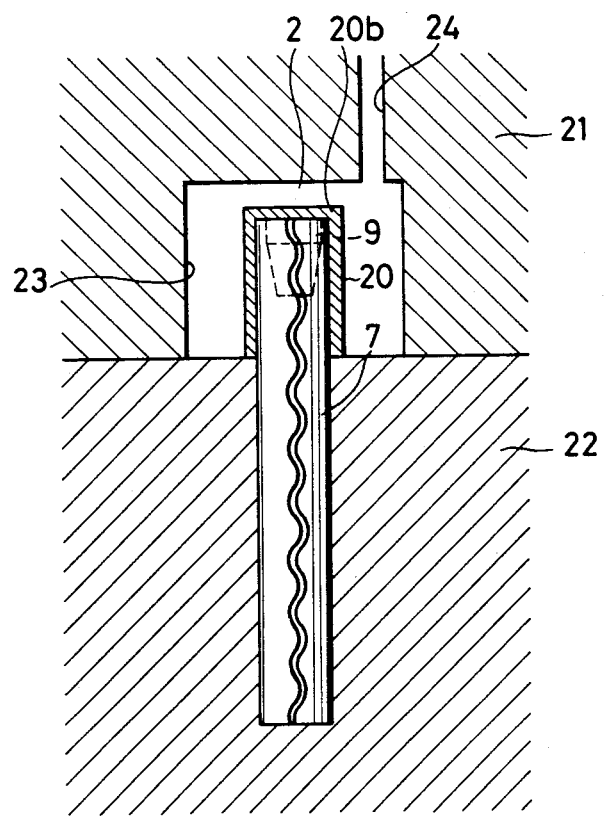
FIG. 5 is a detail view illustrating the main step of a process for integrally molding a stationary member and its pin insertion hole with a bushing end spring pin by injecting molten synthetic resin.

The toilet bowl in a second embodiment according to the present invention is hereinafter described referring to FIGS. 4, 5 and 6. In this embodiment, a cylindrical closed end metal bushing 20 is provided instead of the open ended cylindrical metal bushing 14 in the first embodiment. To fix the metal bushing 20 in a stationary member 2, the bushing is first fitted tightly on one end of a spring pin 7 by a method mentioned below and is then stationary in the fixed member 2 by integral fuse-molding. In this case, the metal bushing 20 is held in a mold 23 comprising upper and a lower portions 21 and 22 and molten synthetic resin is poured into the mold through a sprue 24 so tht the stationary member 2 is formed and bonded to the metal bushing, as shown in FIG. 5. Since the metal bushing 20 has a closed end 20b, there is an advantage in that the molten resin does not enter into the bushing.

Figures 6A, 6B, 6C:
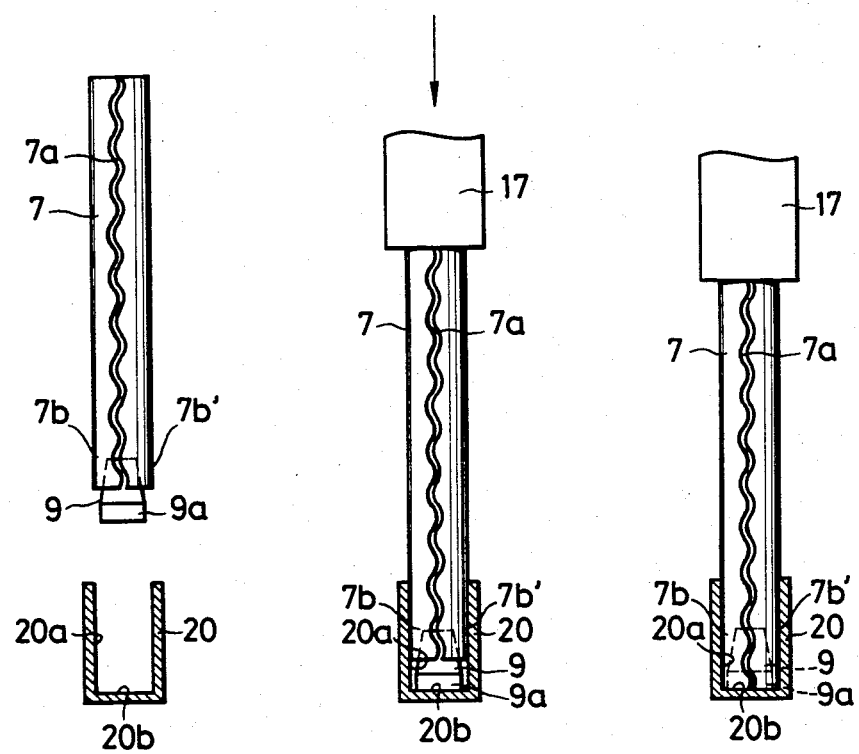
FIGS. 6A, 6B and 6C illustrate the main steps of the assembly of the second embodiment.

The spring pin 7 is fixed in the metal bushing 20 by utilizing the fact that the metal bushing is closed ended, as shown in FIGS. 6A, 6B and 6C. In this case, the wedge 9 is first fitted half in one end 7b of the spring pin 7, as shown in FIG. 6A. the end 7b is then inserted into the closed-bottomed metal bushing 20 so that the wedge 9 is brought into contact with the bottom 20b of the bushing, as shown in FIG. 6B. The end 7b is thereafter inserted more deeply in the metal bushing 20 so that the wedge 9 is fully and tightly fitted in the end 7b by the reaction, as shown in FIG. 6C. This tight fitting can be very simply effected by hitting the other end of the spring pin 7 with a hammer 17.

Figure 7:
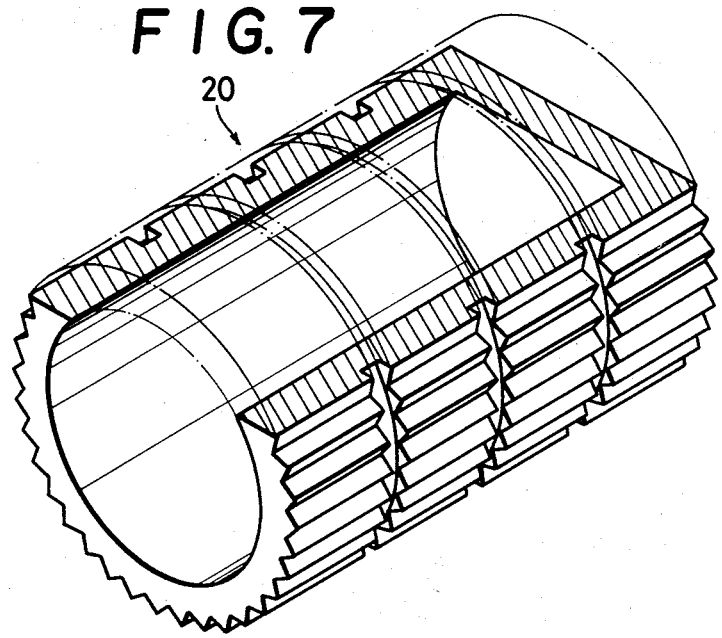
FIG. 7 is a partially-cutaway perspective view of a metal bushing.

In the second embodiment, since the closed-bottomed metal bushing 20 is used as mentioned above, the quantity of the expansion of the bushing is very small although the wedge 9 is tightly fitted in the spring pin. In other words, the contact pressure between the outer surface 7b, of the spring 7 and the inner surface 20a of the metal bushing 20 is so high that the closed-bottomed bushing is firmly fixed on the end 7b of the spring pin, as shown in FIGS. 6. Therefore, it only the metal bushing 20 that is thereafter fixed in the stationary member 2, the spring pin 7 never dropping out of the pin insertion hole 10. The fixing of the metal bushing 20 in the stationary member 2 can be highly intensified if the outer surface of the metal bushing is provided with protrusions and recesses by knurling or the like as shown in FIG. 7. The metal bushing 20 fixed on the spring pin 7 may be secured in the pin insertion hole 10 by heating the bushing with a high-frequency heater to cause meltbonding. Otherwise, the metal bushing 20 may be secured in the pin insertion hole 10 bonding with an adhesive or by the like. If the stationary member 2 is made of metal, the metal bushing 20 may preferably be fixed therein by shrink fitting. The above-mentioned methods of fixing the metal bushing 20 in the pin insertion hole 10 can also be adopted not only to secure other metal bushings 15, 16 in other pin insertion holes 11, 12 but also to secure the metal bushing 14 in the first embodiment.

Figure 8A:
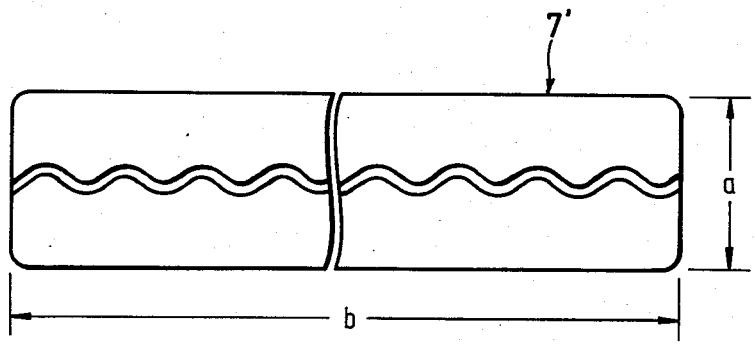
FIGS. 8A, 8B and 8C show the shapes and dimensions of the main parts of a toilet hinge according to the present invention.
Figure 8B:
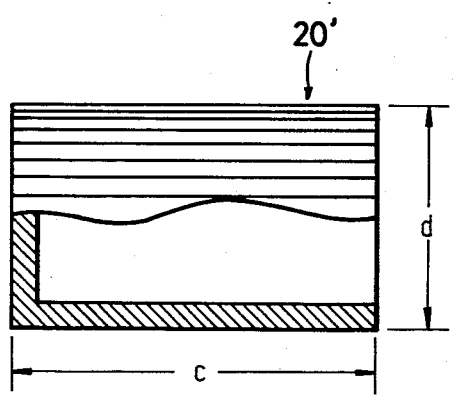
Figure 8C:
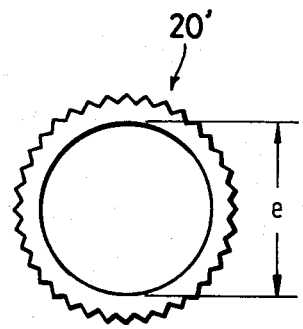

The results of experiments on a combination of a spring pin 7' and a bottomed metal bushing 20', both made of stainless steel, which have shapes and dimensions (a=7.07 mm, b=50 mm, c=15 mm, d=9 mm, e=7.00 to 7.01 mm) as shown in FIGS. 8A, 8B and 8C are hereinafter described. When the wedge 9 is tightly fitted in one end of the spring pin 7', the outside diameter of the end of the pin becomes 7.15 to 7.17 (mm). Therefore, the interference for tightly fitting the wedge 9 in the bottomed bushing 20' is 0.15 to 0.17 (mm). The torque required to break down the stationary member 2 made of ABS resin and fusebonded by integral moding on the closed-bottomed bushing 20' tightly fitted with one end of the spring pin 7' has been measured as 120 kg-cm. This proves that the stationary member fitted with the bushing endures practical use.

In the toilet bowl according to the present inventon, the spring pin, at least one end of which is fixed, is always elastically in tight pressure contact with the inner surface of the metal bushings. For that reason, adequate frictional force acts between the spring pin and the metal bushings to avoid such inconveniences such as the toilet seat and/or lid coupled to the metal bushings impulsively closing due to the weight of the seat and/or lid as soon as the hand opening or closing the seat and/or lid is separated therefrom.

Since the weight of the toilet seat 3 is 800 g or less and the its length is about 440 mm, the moment of gravitational rotation of the seat is not more than $0.8 \times 44 = 35.2$ kg-cm. The spring constant of the spring pin can be determined on the basis of the value of the moment. Because the value of the moment is low, the spring pin can be easily provided with an adequate spring constant which is necessary to obtain adequate frictional force.

What is claimed is:

1. A hinged toilet seat and lid arrangement for a toilet bowl comprising:
 a pair of stationary members adapted to be mounted on said toilet bowl in a spaced apart relationship, each stationary member being formed with a blind bore opening toward the other member and lying in axial alignment with the blind bore thereof, a pair of lugs extending between said stationary members from said toilet seat, each lug being formed with a throughgoing bore lying in axial alignment with said blind bores, a formation extending between said lugs from said lid and formed with a throughgoing bore lying in axial alignment with the bores of said lugs;

a pair of spring pins, each spring pin being seated in one of said respective stationary members and extending through one of said lugs into said formation, each of said spring pins being formed as an elongated thin wall cylindrical sleeve of uniform cross section and wall thickness, said spring pin being further formed with a generally axial slit in the wall thereof extending the length of said sleeve; and respective frustoconical wedges driven into one end of each of said spring pins for expanding same to fix the respective end within a respective blind bore and to provide rotational resistance with respect to said throughgoing bores such as to permit pivoting of said seat and said lid about said pins and to maintain said seat and said lid in any desired position of rotation about said pins.

2. The hinged toilet seat and lid arrangement as defined in claim 1 wherein said spring pins are each fixed in a respective stationary member.

3. The hinged toilet seat and lid arrangement as defined in claim 2 wherein said axial slit is wave shaped.

4. The hinged toilet seat and lid arrangement as defined in claim 3 further comprising respective bushings in each blind bore of said stationary members, in each throughgoing bore of said lugs, and in said throughgoing bore of said formation.

5. The hinged toilet seat and lid arrangement as defined in claim 4 wherein said bushings in said stationary members are formed with one closed end seated against the bottom of the respective blind bore.

6. The hinged toilet seat and lid arrangement as defined in claim 5 wheren said bushings are formed with longitudinal ridges on the outer surface thereof, said ridges being interrupted at intervals by annular grooves.

7. The hinged toilet seat and lid arrangement as defined in claim 4 wherein said bushings are formed with longitudinal ridges on the outer surface thereof, said ridges being interrupted at intervals by annular grooves.

* * * * *